Figure 1:
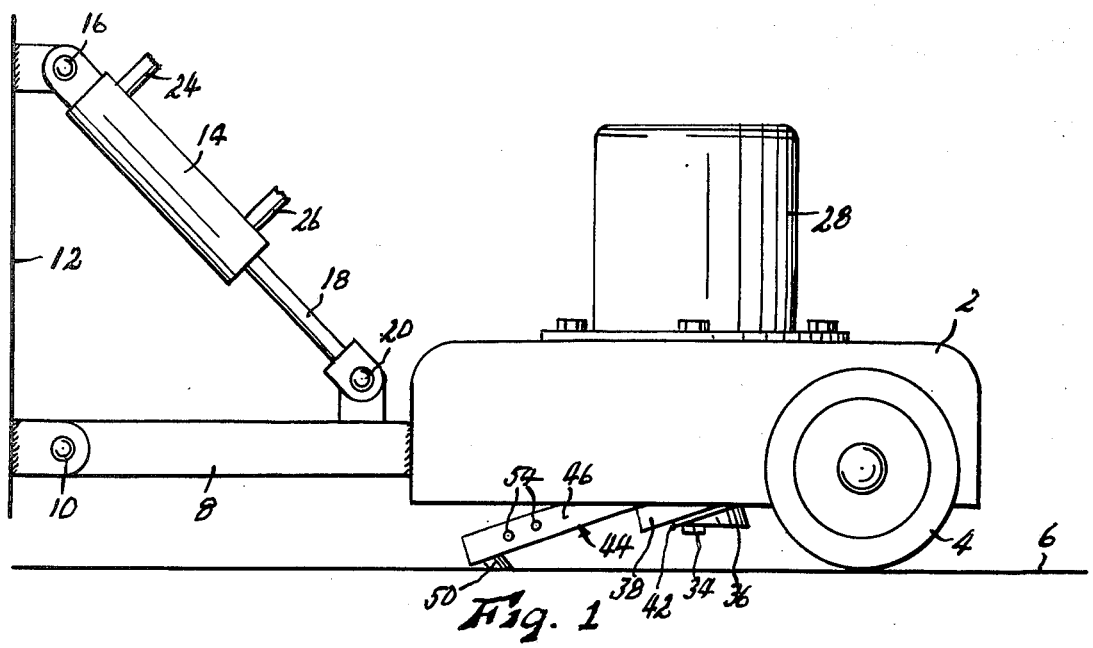

United States Patent [19]

Mullet et al.

[11] 4,204,576
[45] May 27, 1980

[54] SOIL AERATING DEVICE

[75] Inventors: David L. Mullet, Hesston; Raymond J. Rilling, Moundridge; Elmer D. Voth, Newton, all of Kans.

[73] Assignee: Excel Industries Inc., Hesston, Kans.

[21] Appl. No.: 945,699

[22] Filed: Sep. 20, 1978

[51] Int. Cl.² ............................................. A01B 45/02
[52] U.S. Cl. ...................................................... 172/22
[58] Field of Search ................................... 172/21, 22

[56] References Cited

U.S. PATENT DOCUMENTS

| | | | |
|---|---|---|---|
| 2,800,066 | 7/1957 | Cohrs et al. | 172/22 |
| 3,264,877 | 8/1966 | Boxrud | 172/22 X |
| 3,455,398 | 7/1969 | Bowers | 172/21 |
| 3,743,025 | 7/1973 | Thatcher | 172/21 |

Primary Examiner—Paul E. Shapiro
Attorney, Agent, or Firm—John A. Hamilton

[57] ABSTRACT

A soil aerating device consisting of a spindle inclined from vertical but power driven to rotate about a vertical axis, and an arm rotatably mounted at its midpoint on the spindle, having a downwardly projecting tubular tine mounted at each end thereof, and being disposed just above ground level, the gyrating movement of the spindle as it rotates about a vertical axis imparting to the arm a movement having a vertical rocking component in a plane longitudinal thereto, so that said tines are alternately inserted into and withdrawn from the ground to form holes therein, and an axial rocking component around the axis of the arm, so that the arm is caused to "walk" rotatively around the vertical axis of rotation.

10 Claims, 5 Drawing Figures

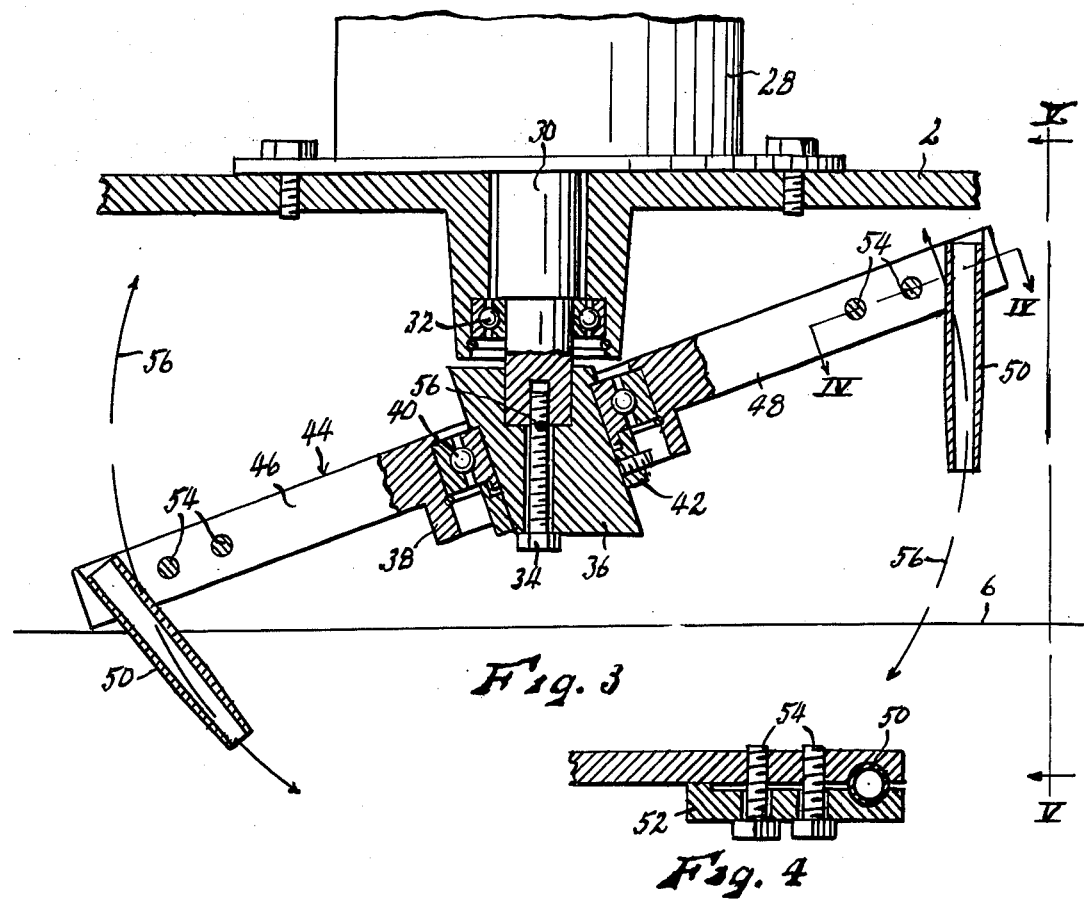
Fig. 3
Fig. 4
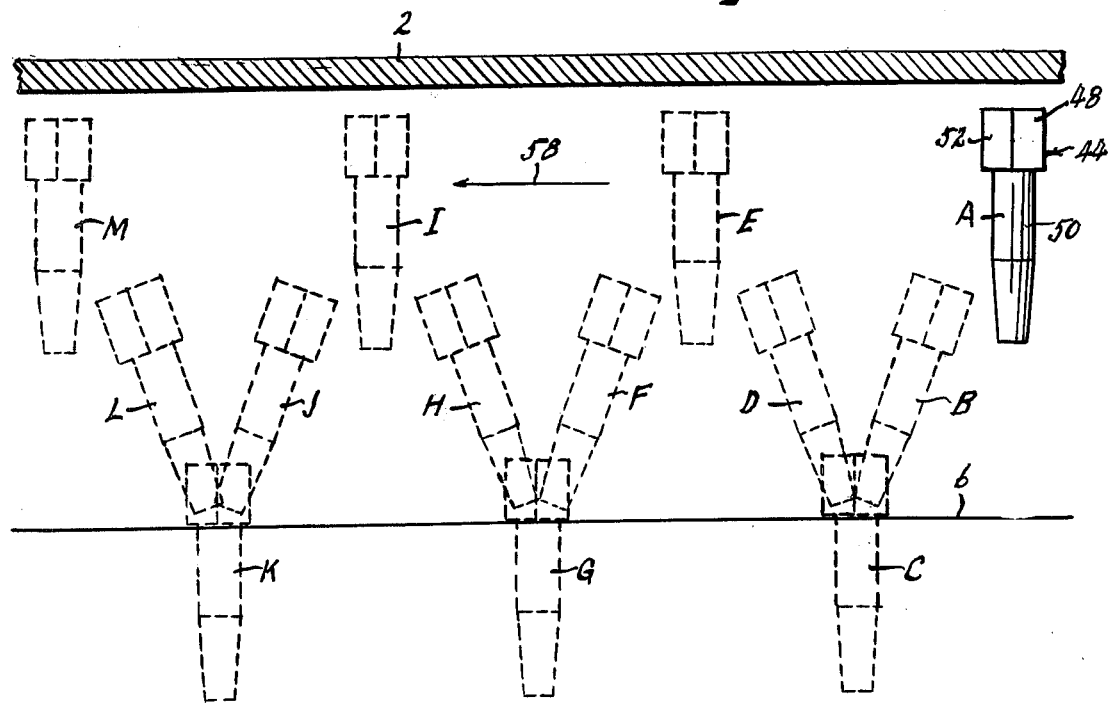
Fig. 5

SOIL AERATING DEVICE

This invention relates to new and useful improvements in soil aerating equipment, and has particular reference to aerators which may be used to aerate lawns, golf fairways and other grassy areas without substantially marring their appearance. Aerators for this purpose commonly function by punching small diameter holes in the ground to admit air below the surface, such holes being substantially invisible to the eye if the grass cover is good. Preferably, for reasons to be described, each hole is formed by actually removing a small plug of earth, the plugs thus removed then being either transported to a remote location for disposal, or simply scattered over the ground surface for rapid break-down by rain and weather.

Aerators of this type have heretofore, so far as is within my knowledge, been large, cumbersome and expensive devices, consisting for example of large cylindrical drums which may be rolled over the ground surface, and which have a large number of outwardly projecting tines mounted in a regularly spaced pattern over the cylindrical surface thereof.

Accordingly, the overall object of the present invention is the provision of a soil aerating device which is extremely simple, compact and inexpensive as compared to prior equipment available for this purpose. In connection with its simplicity, it may punch only one hole at a time, but in such rapid sequence as to be capable of aerating any given area of ground at a fully acceptable rapid rate. It is so compact that the entire machine may, if desired, be no larger than an ordinary hand-propelled rotary lawnmower. In fact, the actual hole-punching elements of the device may, if desired, be mounted in place of the usual grass cutting blades of the mower, and driven by the same power means operable to drive the blades, in order to serve as a low-cost aerating attachment for the mower.

Generally, these objects are accomplished by the provision of a device including a frame, means supporting the frame above the ground and for horizontal movement over the ground, a vertical power-driven drive shaft carried by the frame, a spindle affixed to the lower end of the drive shaft, above ground level, and angled from vertical, an arm diametrical to the spindle and rotatably mounted at its midpoint on said spindle, and a downwardly projecting tubular tine fixed at each end of said arm. The angularity of the spindle axis to its axis of rotation causes the spindle to gyrate, and imparts to the arm a rather complex movement including a rocking component in a vertical plane including the arm axis, whereby the tines at its ends are alternately inserted into and withdrawn from the ground to punch holes therein, and a lateral rocking component about the arm axis. As will appear, this lateral rocking component causes the arm to turn relatively slowly about the axis of the vertical drive shaft in a type of powered "walking" action.

Other objects are simplicity and economy of construction, and efficiency and dependability of operation.

Figure 2:
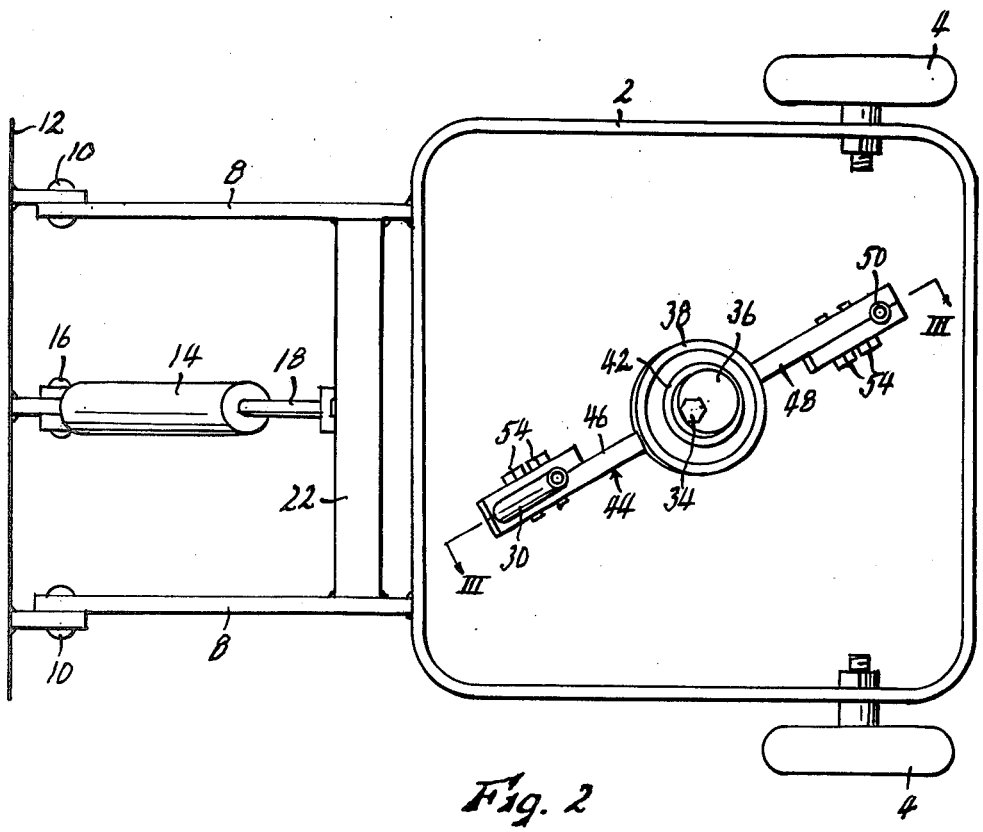

With these objects in view, as well as other objects which will appear in the course of the specification, reference will be had to the accompanying drawing, wherein:

FIG. 1 is a side elevational view of a soil aerating device embodying the present invention, FIG. 2 is an inverted plan view of the device as shown in FIG. 1, FIG. 3 is an enlarged, fragmentary sectional view taken on line III—III of FIG. 2, FIG. 4 is a fragmentary sectional view taken on line IV—IV of FIG. 3, and FIG. 5 is a diagrammatic sectional view taken on line V—V of FIG. 3, illustrating in dotted lines successive positions of one of the tines as it is moved by the tine-supporting arm.

Like reference numerals apply to similar parts throughout the several views, and the numeral 2 applies to the frame or body of the device, said frame being of inverted dish shape and formed of strong metal. It is supported at its forward end by a pair of ground-engaging wheels 4 carried rotatably at the respectively opposite sides thereof, and resting on ground surface 6. At its rearward end, said frame has a pair of push bars 8 affixed thereto and extending rearwardly therefrom, said push bars being pivoted at their rearward ends, as at 10, to a self-propelled vehicle such as a small tractor, indicated at 12. A double-acting hydraulic cylinder 14 is pivoted to tractor 12 at a point above pivots 10, as at 16, and the piston rod 18 of said cylinder is pivoted, as at 20, to a cross bar 22 extending between and affixed to the forward portions of push bars 8. Cylinder 14 is provided with hydraulic supply lines 24 and 26, which are connected to and controlled by a hydraulic system, which may be standard and which is therefore not shown, whereby alternatively either to lower wheels 4 into engagement with ground surface 6 and press them thereagainst, or to raise the entire frame to an elevated position above the ground for easy transport. The direction of travel of the device over the ground is from left to right as viewed in FIG. 1, although this is not pertinent to the operative principles of the device. Alternatively, of course, frame 2 could be provided with additional wheels 4 so as to be entirely self-supporting, and propelled over the ground manually by means of a handle connected thereto, in the manner of an ordinary hand-propelled rotary lawnmower.

Mounted centrally on the upper surface of frame 2 is a prime mover 28, which may for example constitute an electric motor or a gasoline engine, having a vertical power output shaft 30 which projects downwardly through the frame to extend therebelow, being rotatably supported in a ball bearing 32 mounted in the frame, as best shown in FIG. 3. Any other suitable means for rotating drive shaft 30 could of course be employed. Affixed to the downwardly extended end of drive shaft 30, as by screw 34, is a cylindrical spindle 36, the axis of which is inclined acutely relative to the axis of the drive shaft, also as best shown in FIG. 3. A hub member 38 is rotatably mounted coaxially on the spindle by means of a ball bearing 40, and secured thereon by lock ring 42. An arm 44 extends diametrically to hub 38, extending to equal distances at opposite sides of said hub. Said arm may consist of a pair of oppositely extending sections 46 and 48, each affixed to or integral with hub 38 at its inner end.

Affixed to each end of arm 44 is a tine 50, each tine being affixed at its upper end to said arm by means of a clamp bar 52 secured by screws 54 (see FIG. 4), and being inclined downwardly from said arm toward the axis of spindle 36 as shown in FIG. 3. Each of said tines is preferably tubular in form being taperingly reduced in external diameter toward its lower end, and taperingly increased in internal diameter toward its upper end. Both ends of each tine are open and unobstructed.

Spindle 36 and the central portion of arm 44 are disposed well above ground level 6. The angularity of spindle 36 relative to drive shaft 30 is so selected that when the arm is rotated on the spindle the outer ends of the arm will pass in closely spaced relation above ground level 6. This angularity is hence a function of the arm length, the longer the arm the less the relative angularity required. The downward extension of the tines from the arm is such that when the arm is disposed horizontally, as it will be when turned 90 degrees on the spindle from the position thereof shown in FIG. 3, the lower ends of said tines are disposed generally at ground level 6, although a position slightly above or slightly below ground level has no noticeable effect on the operation of the device. The "toe-in" of the tines toward the axis of the spindle is preferably so selected that a line drawn from the point of intersection of the spindle and drive shaft axes (indicated at 56 in FIG. 3) to the extended portion of the tine will be disposed generally at right angles to said tine. Thus, the longer the arms, the less "toe-in" is required.

In the operation of the device, wheels 4 are lowered into engagement with the ground by operation of cylinder 14 and the device propelled over the ground by operation of tractor 12, with prime mover 28 actuated to turn drive shaft 30 at a suitable speed. Although not critical, a speed of about 900 r.p.m., or about half that usually employed in rotary lawnmowers, has been found satisfactory in most cases. Rotation of drive shaft 30 also turns spindle 36, but said spindle gyrates rather than turning on its axis, point 56 of its axis remaining stationary, while all lower points of its axis move in circles concentric with the axis of the drive shaft. This gyratory movement of the spindle is of course transmitted to arm 44 and tines 50. The rotation of the drive shaft is not transmitted directly to arm 44, since one or the other of tines 50 will be inserted into the soil at virtually all times, thereby restraining the arm against rotation with the drive shaft. However, the drive shaft continues to turn, gyrating both the spindle and the arm and tines. This gyratory movement is somewhat complex, but is illustrated in FIGS. 3 and 5.

One component of the gyratory movement is a rocking of arm 44 in a vertical plane about the "center of gyration" at point 56, as indicated by arced arrows 56 in FIG. 3, thereby causing each tine 50 to be inserted into the earth once during each turn of the spindle, as shown at the left side of FIG. 3, and elevated well above ground level as shown at the right side of FIG. 3. The downward thrust of each tine into the ground is powered by drive shaft 30 despite the rotatability of the arm on the spindle, since once the point of the tine enters the ground, it anchors the arm against rotation, so that the continued turning of the spindle supplies the downward thrust on the tine. The toe-in of the tines provided that, as relates to the vertical plane of the arm, said tines may enter and leave the ground with as little lateral displacement as possible, in order that the ground hole formed by the tine will be as clearly accurate as practical, with very little transverse deformation thereof. Such deformation of the holes could be defacing to a well kept lawn. It would be possible, though not ordinarily necessary or practical, to form the tines arcuately and concentrically with point 56. This would eliminate all transverse deformation of the hole in the vertical plane of the arm.

Another component of the gyratory movement imparted to arm 44 and tines 50 by spindle 36 is a rocking of the arm about its own longitudinal axis, as illustrated in FIG. 5. FIG. 5 illustrates a tine 50 at the top of its travel at A, and successive positions of the same tine at B, C, D, E, etc. The arrow 58 indicates the direction of forward angular travel of the tine, having reference to the direction of rotation of drive shaft 30. At position A, the tine is disposed in a vertical plane, and arm 44 is restrained against rotation by the engagement of the opposite tine in the ground. When the arm is moved to a horizontal position, as indicated at position B of the tine, said tine will be tilted downwardly and forwardly in the direction or arm rotation as indicated by arrow 58. At this time the points of the tines should be at or directly adjacent ground surface 6, the tine lengths having been selected to provide this relationship. The tine then enters the ground as the arm is further lowered, and moves to position C of full penetration. During this penetration, the tine again rocks into a vertical plane, as shown at C, and the arm is advanced rotatively to the C position. The rocking of the arm about its axis is then reversed, so that as the tine is then withdrawn from the ground by the vertical rocking of the arm, with its point anchored in the ground, the reversal of lateral tilt of the tine forces the arm to advance from the C position to the D position, thus advancing the arm rotatably. The arm is then rotatably advanced to the E position, and again laterally tilted to lie in a vertical plane, by the fact that the opposite tine is then engaged in the ground. That is, the arm at each tine is rotatably advanced from the A position to the B position, and from the D position to the E position, during which periods said tine is not engaged in the ground by equal but opposite forces applied thereto by the opposite tine, which of course is engaged in the ground during these periods. Thus, substantially independently of any rotative force applied thereto by the drive shaft, arm 44 and tines 50 "walk" around the drive shaft, at a speed much lower than that of the drive shaft, being powered in this walking movement almost solely by the vertical and lateral oscillatory motions imported to the arm and tines by the gyration of the spindle. It will be readily apparent from FIG. 5 that the drive shaft may be turned in either direction without affecting the described actions.

The "rocking" of the tine into and out of the ground, in the direction of horizontal rotary travel of the tine, greatly reduces any enlargement of the holes punched in the ground in that direction, and hence reduces the defacement of the lawn by the aerating device. That is, while the tine of course does rock to some extent about the arm axis while engaged in the ground, this rocking movement, and hence the resultant enlargement of the upper end of the hole punched in the ground, is minimized by the described action. Also, the forward movement of frame 2 over the ground may tend to enlarge the holes punched in the ground, by "dragging" the tines while they are engaged in the ground. However, this effect may be minimized by turning the drive shaft at a high speed and moving the frame at a low speed. For example, if drive shaft 30 is turned at 900 r.p.m. as previously suggested, spindle 36 will turn 15 revs. per second, and the device will "punch" about 30 holes per second (15 by each tine), with each tine being engaged in the ground for only about 1/30 of a second for each hole. This engagement time could be still further reduced by increasing the rotational speed of the drive shaft. Thus if the horizontal speed of the frame is kept sufficiently slow, any dragging of the tines in the ground may be rendered negligible. By combining the toe-in of the tines, the axial rocking of the arm about its longitudinal axis, a sufficiently high drive shaft speed, and a sufficiently low frame speed, the punched holes may be kept adequately neat and unenlarged to avoid defacing a lawn or other grassy surface to any appreciable degree. The grass itself tends to cover and conceal the holes and render them invisible, as long as the grass cover is reasonably good.

As each tine enters the ground, a plug of earth enters its lower end, and is withdrawn from the ground with the tine as the latter is withdrawn. The earth plug is forced upwardly in the tine and discharged from the open upper end thereof by subsequent plugs entering its lower end during subsequent insertions of the tine. The insertion of the tine is facilitated by the external taper thereof, and the passage and discharge of the plugs therethrough are facilitated by its internal taper. The discharged earth plugs are scattered over the grass surface, but are not considered detrimental or seriously defacing to the lawn, since they are rapidly broken up by rain, or by artificial watering, or by other weather conditions, and return to the underlying soil. It would of course be possible to punch holes in the soil with solid rather than tubular tines, and such solid tines would have the advantage of not discharging earth plugs over the surface. However, holes punched with solid tines have been found also to have two principal disadvantages. First, the walls of such holes are compacted outwardly by the solid tine, and these compacted walls are comparatively impervious to the passage of air therethrough so that less air can enter into and circulate in the surrounding soil. Second, such compacted walls have a tendency to "rebound" to a degree after the tine is withdrawn, therefore tending to close or "heal" the hole so that air can enter the soil therethrough for only a shorter period of time. The tubular tines shown do not compact the soil to nearly as great a degree as solid tines, and the use of the tubular tines is therefore preferred. Also, leaving the soil plugs scattered on the ground tends to cause any grass clippings on the ground surface, as for example when the aerating is performed after cutting the lawn, to decompose, and the decaying clippings return to the soil as a fertilizer.

While I have shown and described a specific embodiment of my invention, it will be readily apparent that many minor changes of structure and operation could be made without departing from the spirit of the invention.

What I claim as new and desire to protect by Letters Patent is:

1. A soil aerating device comprising:
   a. a frame,
   b. means supporting said frame for movement over the ground at a generally constant elevation above ground level,
   c. a vertical drive shaft carried rotatably by said frame,
   d. power means operable to rotate said drive shaft,
   e. an arm freely rotatable about an inclined axis transverse thereto and lying in a vertical plane,
   f. a depending tine affixed to each end of said arm, and
   g. a drive member interposed between and interconnecting said drive shaft and said arm, said drive member being powered by said drive shaft and operable to impart to said arm a compound movement including a first oscillatory component about a horizontal axis transverse to the midpoint of said arm, whereby each end of said arm oscillates vertically to equal distances above and below horizontal, the tine at each end of said arm being operable to punch a hole in the soil beneath said arm as that end of the arm moves downwardly from horizontal to the lower limit of its vertical oscillation, and a second oscillatory component about the longitudinal axis of said arm, whereby said tines are oscillated between limits disposed equally at opposite sides of the vertical plane of said arm, said first and second oscillatory movements being so synchronized that said tines are disposed in vertical planes when said arm is disposed at the upper and lower limits of its vertical oscillation, and that the tine at each end of said arm is tilted forwardly of the vertical plane of said arm, having reference to the direction of rotation of said drive shaft, as that end of the arm moves from its upper limit of vertical oscillation to horizontal, is tilted again to a vertical plane as that end of the arm moves downwardly from horizontal to the lower limit of its vertical oscillation, is tilted rearwardly of the vertical plane of said arm as that end of the arm returns from the lower limit of its vertical oscillation to horizontal, and returns to a vertical plane as that end of the arm moves from horizontal to the upper limit of its vertical oscillation.

2. The device as recited in claim 1 wherein the angle of inclination of the rotational axis of said arm is such that each end of said arm closely approaches ground level at the lower limit of its vertical oscillatory movement.

3. The device as recited in claim 2 wherein said tines are inclined downwardly from the ends of said arms toward the rotational axis of said arm at such a degree that a line drawn from the horizontal axis of vertical oscillation of said arm to the projecting tine will be disposed generally at right angles to the longitudinal extent of said tine.

4. The device as recited in claim 3 wherein each of said tines is tubular in form, being open and unobstructed at both ends thereof.

5. The device as recited in claim 1 wherein each of said tines is tubular in form, the bore thereof being open and unobstructed at both ends thereof, and being taperingly enlarged toward the upper end thereof.

6. The device as recited in claim 1 wherein said drive member constitutes a spindle affixed non-rotatively to the lower end of said drive shaft, the axis of said spindle being inclined acutely relative to the axis of said drive shaft whereby said spindle is gyrated by axial rotation of said drive shaft, said arm being rotatably mounted at its midpoint on said spindle for rotation coaxially thereto whereby gyration of said spindle imparts to said arm a gyratory movement including a vertical rocking component in a vertical plane about a horizontal transverse axis at its midpoint, and an axial rocking component about its longitudinal axis.

7. The device as recited in claim 6 wherein said tines are angled relative to said arm to lie in a vertical plane substantially at the midpoint of the axial oscillation of said arm, and at the upper and lower limits of the vertical oscillation of said arm.

8. The device as recited in claim 7 wherein the projection of said tines below said arm is such that the lower ends thereof are disposed approximately at ground level when said arm is disposed horizontally at the mid-point of its vertical oscillation.

9. The device as recited in claim 8 wherein said tines are disposed generally in a plane containing the axis of said spindle, and are inclined downwardly from said arm toward said axis at such an angle that lines drawn at right angles to the projecting portions thereof intersect the axis of vertical oscillation of said arm.

10. The device as recited in claim 9 wherein each of said tines is tubular in form, the bore thereof being open and unobstructed at both ends thereof.

* * * * *